US009892101B1

(12) United States Patent
Donnelley et al.

(10) Patent No.: US 9,892,101 B1
(45) Date of Patent: Feb. 13, 2018

(54) AUTHOR OVERLAY FOR ELECTRONIC WORK

(71) Applicant: AMAZON TECHNOLOGIES, INC., Seattle, WA (US)

(72) Inventors: Samuel Ytzhak Donnelley, Auburn, WA (US); Sarah Elizabeth Funk, Seattle, WA (US); Kelli Martin, Seattle, WA (US); Jill Haick Taplin, Seattle, WA (US); Justin Larsen Golenbock, Brooklyn, NY (US); Christina J. Wiley, Port Orchard, WA (US); Julie Lynne Teodorescu-Badia, Redmond, WA (US); Anne Michelle Fisher, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 495 days.

(21) Appl. No.: 14/491,918

(22) Filed: Sep. 19, 2014

(51) Int. Cl.
*G06F 17/24* (2006.01)
*G06F 3/0484* (2013.01)
*G06F 3/0483* (2013.01)
*G06F 17/30* (2006.01)
*G06F 17/22* (2006.01)

(52) U.S. Cl.
CPC ............ *G06F 17/24* (2013.01); *G06F 3/0483* (2013.01); *G06F 3/04842* (2013.01); *G06F 17/2247* (2013.01); *G06F 17/30* (2013.01)

(58) Field of Classification Search
CPC .......... G06F 17/00; G06F 17/24; G06F 17/30; G06F 17/2247; G06F 3/048; G06F 3/0483; G06F 3/04842
See application file for complete search history.

(56) References Cited

U.S. PATENT DOCUMENTS

| 8,260,915 | B1* | 9/2012 | Ashear | G06F 13/00 709/224 |
| 8,745,154 | B1* | 6/2014 | Froment | H04L 67/306 709/217 |
| 8,834,166 | B1* | 9/2014 | Lonkov | G06F 17/30595 434/178 |
| 9,069,332 | B1* | 6/2015 | Gayles | G04F 10/00 |
| 9,128,591 | B1* | 9/2015 | Arora | G06F 17/30876 |
| 9,326,116 | B2* | 4/2016 | Kandekar | G06Q 30/0214 |
| 2008/0270384 | A1* | 10/2008 | Tak | G06F 17/30734 |
| 2010/0031132 | A1* | 2/2010 | Yamaji | G06F 17/211 715/203 |
| 2012/0054672 | A1* | 3/2012 | McDowell | G09B 17/003 715/784 |
| 2012/0324337 | A1* | 12/2012 | Mbenkum | G06F 17/241 715/234 |
| 2013/0185198 | A1* | 7/2013 | Lorch | G06Q 20/29 705/39 |

(Continued)

*Primary Examiner* — Thu Huynh
(74) *Attorney, Agent, or Firm* — Lowenstein Sandler LLP

(57) ABSTRACT

A processing device receives data associated with consumer interactions with an electronic work. The processing device determines, based on the received data, a plurality of aggregated consumption behaviors with regards to the electronic work. The processing device associates one or more of the plurality of aggregated consumption behaviors with portions of the electronic work in a data file. The processing device then provides the data file to a user device.

10 Claims, 10 Drawing Sheets

(56) References Cited

U.S. PATENT DOCUMENTS

| | | | |
|---|---|---|---|
| 2014/0164593 A1* | 6/2014 | Murray | G06Q 30/02 709/224 |
| 2016/0154552 A1* | 6/2016 | Yerli | G06F 3/0483 715/776 |
| 2016/0171112 A1* | 6/2016 | Tahir | G06F 17/30867 705/27.1 |
| 2016/0378720 A1* | 12/2016 | Bacus | G06F 17/214 715/251 |

* cited by examiner

AUTHOR OVERLAY FOR ELECTRONIC WORK

BACKGROUND

A large and growing population of users enjoy entertainment through the consumption of media items, such as electronic books (also referred to herein as e-books), electronic newspapers, electronic magazines, digital videos (e.g., movies and television programming), digital music, and so on. Users employ various electronic devices to consume such media. Among these electronic devices are electronic book readers, cellular telephones, personal digital assistants (PDAs), portable media players, tablet computers, electronic pads, netbooks, desktop computers, notebook computers, and the like.

The electronic devices used for consumption of media may record information and send it to servers. This information could potentially be beneficial to authors, publishers, producers, etc. of the electronic work, such as to determine statistics about consumption of the media items for presentation to the authors, publishers, producers, etc.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION

Figure 1:
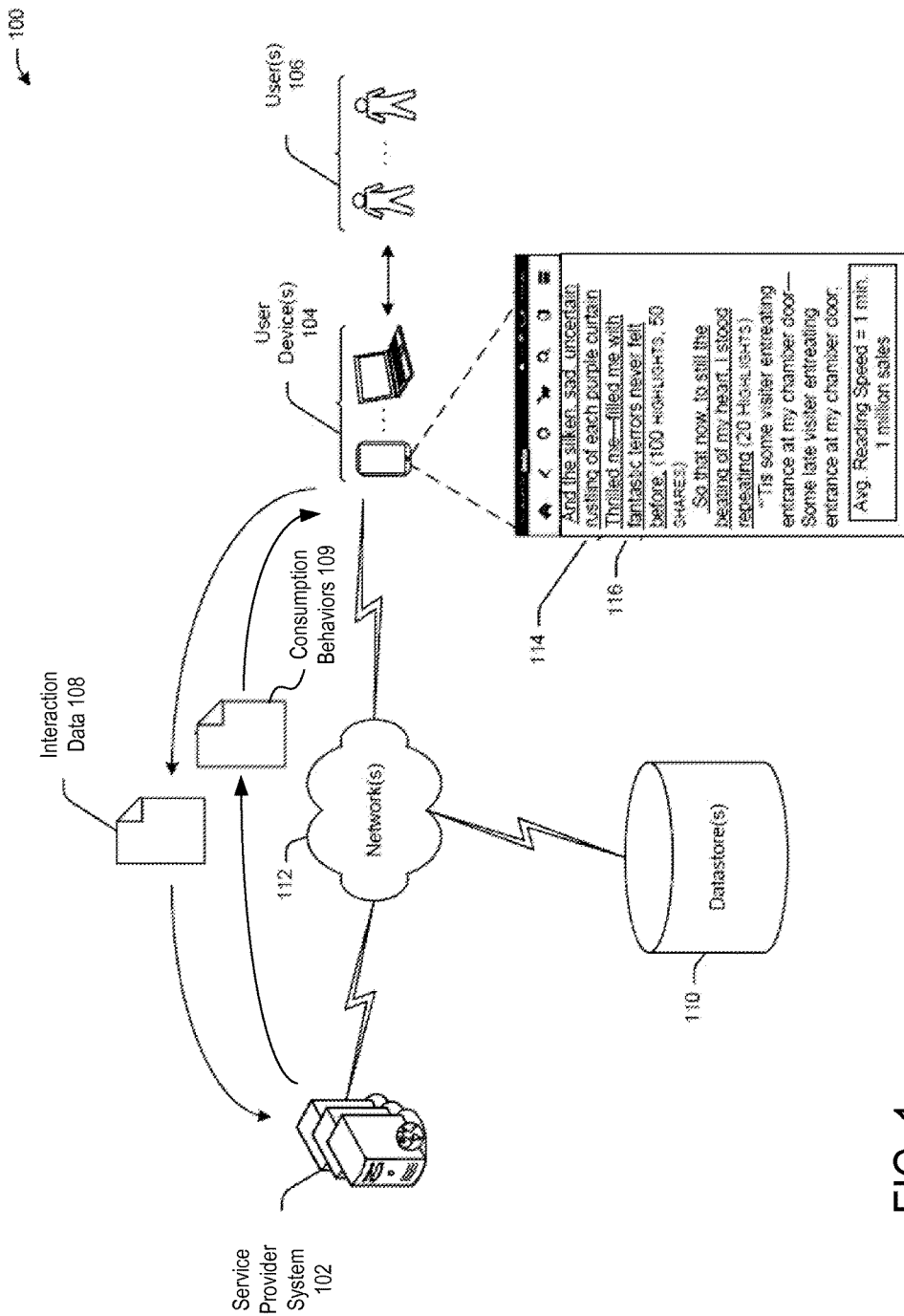
FIG. 1 is a block diagram of an example network architecture, in which embodiments of the present invention may operate.

Described in embodiments herein is a system and techniques for providing useful aggregated consumption behavior information to authors or other creators (e.g., to author user profiles) and other concerned parties associated with the creation or publication of electronic works. As used herein, an aggregated consumption behavior is any aggregated statistical information associated with the purchase, use, reading, viewing, listening, discussion, sharing, etc. of an electronic work. Aggregated consumption behaviors are based on passively collected data (data that is not received responsive to a request for a user to provide such data). Thus, aggregated consumption behaviors are determined without polling consumers or otherwise requesting any input from consumers for the purpose of determining consumption behaviors. Examples of aggregated consumption behaviors include aggregated sales data for an electronic work, aggregated reviews of the electronic work, aggregated social network activity associated with the electronic work (e.g., posts about the electronic work), aggregated reading speeds, aggregated click streams, aggregated highlight data, aggregated sharing information, and so forth. Many other types of aggregated consumption behaviors are also envisioned, some of which are discussed in embodiments herein.

Embodiments are described herein with reference to authors and author profiles. However, it should be understood that embodiments additionally apply to other types of creators, and to user profiles for such other types of creators. As used herein, a creator of an electronic work may be an author, publisher, composer, producer, television studio, art studio, performance venue, investor, sponsor, or other entity that contributes to or supports the creation of any type of electronic work, whether it be written, video or audio work (e.g., musical, audio book, etc.). Accordingly, it should be understood that discussion herein of authors and author profiles also applies to all types of creators and creator profiles.

A server computing device receives data associated with consumer interactions of many consumer profiles (e.g., from many consumers) with an electronic work. These consumer interactions may have been recorded and/or determined by user devices (e.g., electronic book readers, tablet computers, televisions, laptop computers, etc.) on which the electronic work was consumed. In the example of an electronic book, the consumer interactions may include page turns, amounts of time that readers spent on each page, highlights made to passages of the electronic book, dates that pages were read, comments made about the electronic book, and so forth. The consumer interactions may additionally include consumption statistics that were generated by the user devices. The computing device may then determine, based on the received data, multiple aggregated consumption behaviors with regards to the electronic work. Continuing the example of an electronic book, the computing device may determine average reading speeds for each page of the electronic book, where readers typically abandoned the electronic book, favorite characters of the electronic book, passages of the electronic book that readers particularly enjoyed or disliked, and so forth. The processing device associates one or more of the aggregated consumption behaviors with portions of the electronic work in a data file such as a data overlay. As used herein, a portion of a written electronic work may be a passage, page, paragraph, and/or any other range of written content. Similarly, for electronic works that do not include written content, a portion includes any subset of the content (e.g., a scene, frame, sequence of frames, etc. in a video).

When the author or other interested party reviews the electronic work (e.g., reads the electronic book), data from the data file may be shown alongside, over or together with the electronic work. For example, when an author turns to a page of an electronic book that he or she wrote, the data from the data file may be presented as a data overlay that shows reading behaviors associated with the shown page. For example, the average reading speed for the current page, reader highlights of passages on the page, reader comments associated with passages or events in the page, and so on may be shown to the author. Similarly, for videos consumption behaviors associated with a particular scene of the video may be shown in an overlay. Similar information may also be shown for music or other electronic media.

Embodiments provide authors and other interested parties with a valuable tool for analyzing the strengths and weaknesses and consumer likes and dislikes of the authors' works. Consumption behaviors may be shown together with an electronic work in the same reading, listening and/or viewing experience as the work. Additionally, consumption behaviors may be shown in a navigable form that may be presented separately or together with the electronic work. Authors may use intuitive filter controls to select subsets of consumer profiles to generate aggregated consumption behaviors for, and to control which aggregated consumption behaviors are displayed. Thus, authors may determine reading behaviors for specific demographic groups to determine how their work fares with such groups, and may compare aggregated reading behaviors between different demographic groups. Such data may assist an author in improving an existing work or a future work, in improving sales, and so on.

FIG. 1 is a schematic diagram depicting an illustrative network architecture 100 in accordance with embodiments of the disclosure. The network architecture 100 may include a service provider system 102 connected to one or more user devices 104 and one or more data stores 110 via one or more networks 112.

The service provider system 102 corresponds to any functionality or combination of functionality for providing digital works (e.g., media items) to the user devices 104. The service provider system 102 includes a network-accessible server-based functionality (e.g., a media server), various data stores (e.g., data stores 110), and/or other data processing equipment. The service provider system 102 may be implemented by a single machine or a cluster of machines. The service provider system 102 may include one or more machines (e.g., one or more server computer systems, routers, gateways, etc.) that have processing and storage capabilities to provide the server-based functionality. The service provider system 102 may include any suitable computing device including, without limitation, a server computer, a mainframe computer, a workstation, a desktop computer, a laptop computer, and so forth.

In one embodiment, the service provider system 102 corresponds to an entity which provides electronic works to users upon the users' purchase of the electronic works. In other cases, the service provider system 102 corresponds to an entity which provides electronic works to users on a non-fee basis or on the basis of some other type of alternative compensation arrangement.

The service provider system 102 delivers, and the user devices 104 receive, electronic works (media items), search results, upgrades, and/or other information via the network 112. For example, the user devices 104 may download or receive e-books, movies, television shows, etc. from the service provider system 102. The service provider system 102 also receives various requests (e.g., search queries), instructions and other data (e.g., interaction data 108) from the user devices 104 via the network 112.

The user devices 104 may be portable computing devices such as electronic book readers or tablet computers (e.g., that include a book reader application). Other examples of portable computing devices include cellular telephones, personal digital assistants (PDAs), portable media players, netbooks, laptop computers, tablet computers, portable gaming consoles, and the like. The user devices 104 may also be traditionally non-portable computing devices such as a desktop computer, a set-top box associated with a television, a gaming console, a multimedia content streaming device and so on. The user devices 104 are variously configured with different functionality to enable consumption of one or more types of electronic works. While various illustrative components of the network architecture 100 may be described herein in the singular, it should be appreciated that multiple ones of any such components may be provided in various example embodiments of the disclosure.

The service provider systems 102 and the user devices 104 may each be configured to communicate with one or more entities of the network architecture 100 via one or more networks 112. The network(s) 112 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 112 may have any suitable communication range associated therewith and may include, for example, public networks (e.g., the Internet), metropolitan area networks (MANs), wide area networks (WANs), local area networks (LANs), or personal area networks (PANs). In addition, the network(s) 112 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

Users may read, view, listen to, play, or otherwise consume electronic works using the user devices 104. The term electronic work as used herein refers to any publication (e.g., any written work), video, audio, application (app), game or other media item stored in a digital format. Examples of electronic works include electronic publications (e.g., electronic versions of written works such as electronic books (e-books), electronic newspapers, electronic periodicals, electronic magazines, videos (e.g., music videos, video documentaries, movies, episodes of television series), and so forth. Other examples of electronic works include digital audio books, electronic textbooks, electronic journals, real simple syndication (RSS) feeds, etc. Other examples of electronic works include computer games, apps installed on user devices 104, and so forth. The electronic works may be stored on the user devices 104. The electronic works may also be stored on the service provider systems 102, the data stores 110, and/or any other storage location, and may be streamed to the user devices 104.

According to one or more embodiments, as users 106 consume the electronic works on the user devices 104, data about user interactions with the electronic works is recorded. Each user device 104 may be associated with a particular user profile. Thus, as an electronic work is consumed on that user device, all user interactions with the electronic works are associated with that particular user profile. In addition to user interaction data, the user profile may include demographic information about the user, historical data about the user, purchase information about the user, and/or other information. Any user interaction with the user device 104 during presentation of an electronic work may be recorded and associated with that electronic work (and with a user profile). In the example of electronic publications, such user interactions may include page turns, timeouts, user device 104 location, opening and closing of the electronic work, power on and off of the user device 104, and so forth. Such user interactions may additionally include inputs received by the user devices, such as keyboard inputs (e.g., as alphanumeric keys are pressed), mouse inputs, touchscreen or touchpad inputs, button press inputs, and/or other types of inputs (e.g., voice inputs or image capture inputs). In the example of videos, user interactions may additionally or alternatively include pause events, fast forward events, fast forward speed, rewind events, rewind speed, volume settings, and so forth. Many other user interactions may also be recorded, such as user highlights of text, input user comments, keyboard presses, scrolling events, mouse events, and so on. These types of events can be tied to portions of content (e.g., timestamps of content associated with begin fast forward and stop fast forward, timestamps of content associated with begin rewind and stop rewind, length of time and timestamp of pause event, etc.).

In one embodiment, the user devices 104 may be configured to identify the beginnings and ends of different reading or viewing sessions associated with users 106. For example, any time a user 106 selects an electronic work to read, watch or listen to, the user device 104 identifies the selection as the beginning of a new session. Subsequently, various events may indicate the end of the session. For instance, one example event may be a display of the user device 104 being switched off and/or otherwise deactivated (e.g., directly by the user and/or or independently by the user device 104). Another event may be the display switching to a screensaver due to a period of inactivity on the user device 104. Another event may be a user selection to exit from a reading or viewing application, such as to switch to another application that may be executing on the user device 104. Yet another event may be a determination by the reading or viewing application and/or user device 104 that the user has been inactive for a predetermined period of time. It will be appreciated that any number or types of events that indicate the end of a read session are also contemplated.

The user device 104 may be configured to determine or identify interaction data 108 associated with a session responsive to determining that the session has ended. In one embodiment, the user device determines statistics about the session and includes the statistics in the interaction data 108. To this end, reading statistics for a read session may include, but are not limited to, a length (e.g., in time) of the read session, an amount of text read during the session, a device identifier indicating a device on which the session was performed, a reading speed for the session, reading speeds for individual portions of an electronic publication read during the session, a timestamp, a genre of the electronic publication read during the session, and/or any other statistical information. Interaction data 108 may also include user highlights of passages, passages that have been shared with other users (e.g., via social networks, email, etc.), user interaction with an overlay or second screen that provides information about an electronic work, user submitted typos, a user click-stream (e.g., data identifying when a user 106 clicked on a screen, where the user clicked, actions associated with clicking on the screen, etc.), indication of an electronic work that was consumed prior to a present electronic work, information on how soon the electronic work was consumed after purchase, information on activities that were performed after the electronic work was consumed, and so forth. Additionally, the user device 104 may be configured to transmit the interaction data 108 to the service provider system 102. In certain implementations, the user device 104 may transmit interaction data 108 to the service provider system 102 after the end of each session. Alternatively, or additionally, user devices 104 may periodically transmit interaction data 108 to data stores 110.

The service provider system 102 may store the interaction data 108 in the data store(s) 110. The data store(s) 110 may include any suitable input or output data utilized or generated in accordance with example embodiments of the disclosure. Data stored in the data store(s) 110 may include interaction data 108 corresponding to previous sessions associated with the users 106. Thus, the service provider system 102 may aggregate the newly received interaction data 108 with previously stored interaction data corresponding to previous sessions. The resulting aggregated statistics may be used by the service provider system 102 to determine aggregated consumption behaviors and/or other insights that will be described in more detail herein below. Other data may also be received and used to determine additional aggregated consumption behaviors. Such other data may include user reviews, which may be received from a review data store (e.g., associated with a review service). Other data may also include data received from social network services, sales data received from sales services, and so on. Furthermore, the stored interaction data 108 may be associated with sessions that have taken place across multiple electronic works and/or multiple user devices 104.

After the service provider server 102 has determined aggregated consumption behaviors 109 with regards to an electronic work, service provide server 102 may generate a data file containing data for such aggregated consumption behaviors and send the data file to one or a few user devices 104. For example, service provider system 102 may send the data for the aggregated consumption behaviors 109 to a user device 104 associated with an author user profile for an author of the electronic work (or to a creator user profile for a creator of the electronic work). The creator (or author) user profile may include a flag or identifier indicating that the user profile is for a creator of the work. The presence of this flag or identifier in a user profile may grant the user profile access to data for the aggregated consumption behaviors, which may not be accessible to most user profiles. The author may then review the aggregated consumption behaviors alone or in conjunction with the electronic work, as discussed in greater detail below. The provided aggregated consumption behaviors may provide the author with insights into customer viewpoints and interactions with the author's work.

An example user interface 114 is depicted in FIG. 1 as being rendered on a user device 106. The user interface 114 may be rendered, for example, by a reading application executing on the user device 104. The user interface 114 may, for example, provide a view of one or more electronic works 116 in a user's 106 library (e.g., in a library associated with an author user profile). The example user interface 114 displays a portion of an electronic work 116 along with a data file (e.g., for an author overlay) that provides information about consumption of the electronic work 116.

The author may read through or browse through the electronic work 116. As the user reads through the electronic work 116, information on aggregated consumption behaviors 109 may be presented together with portions of the electronic work 116. Some or all aggregated consumption behaviors may be shown in-line with portions of the electronic work (e.g., in-line with text of an electronic book). As shown, a first passage of the electronic work 116 is underlined and associated with aggregated consumption behavior information showing that the first passage was highlighted by 100 users and was shared by 50 users. Similarly, a second passage of the electronic work is underlined and associated with aggregated consumption behavior information showing that the second passage was highlighted by 20 users.

Some or all aggregated consumption behaviors may be presented in an overlay, pop-up, window, or other interface that is not in-line with portions of the electronic publication. For example, an average reading speed for a current page and sales activity for the electronic work are shown at a bottom of the user interface 114. Aggregated consumption behavior information may also be shown to the left, right and/or top of the portions of the electronic work.

Figure 2:
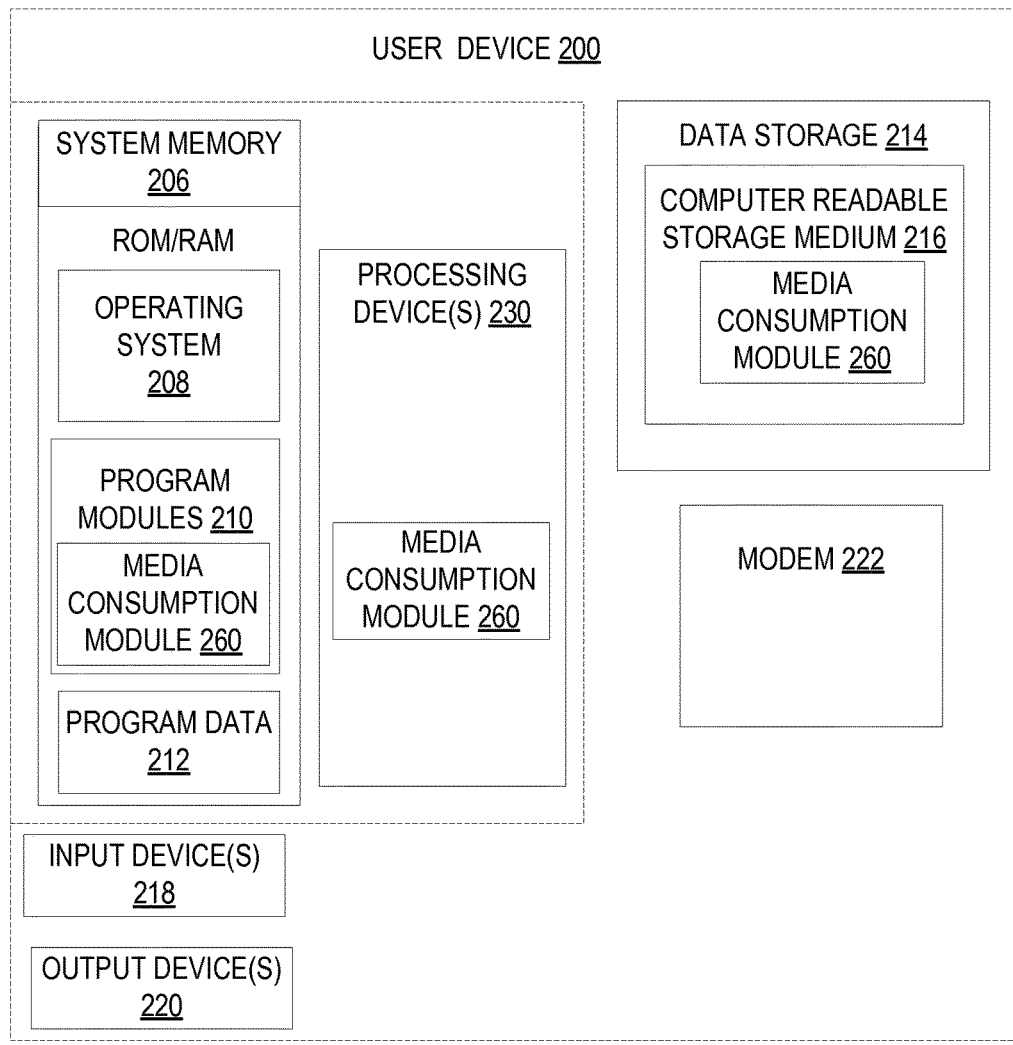
FIG. 2 is a block diagram illustrating an example user device that includes a media consumption module, in accordance with one embodiment.

FIG. 2 is a block diagram illustrating an exemplary user device 200. The user device 200 may correspond to the user device 104 of FIG. 1 and may be any type of user device such as an electronic book reader, a personal digital assistant (PDA), a mobile phone, a laptop computer, a portable media player, a tablet computer, an electronic pad, a desktop computer, a camera, a video camera, a netbook, and the like.

The user device 200 includes one or more processing devices 230, such as one or more CPUs, microcontrollers, field programmable gate arrays, or other types of processors. The user device 200 also includes system memory 206, which may correspond to any combination of volatile and/or non-volatile storage mechanisms. The system memory 206 stores information which provides an operating system component 208, various program modules 210 such as media consumption module 300, and/or other components. The user device 200 performs functions by using the processing device(s) 230 to execute instructions provided by the system memory 206.

The user device 200 also includes a data storage device 214 that may be composed of one or more types of removable storage and/or one or more types of non-removable storage. The data storage device 214 includes a computer-readable storage medium 216 on which is stored one or more sets of instructions embodying any one or more of the methodologies or functions described herein. As shown, instructions for the media consumption module 260 may reside, completely or at least partially, within the computer readable storage medium 216, system memory 206 and/or within the processing device(s) 230 during execution thereof by the user device 200, the system memory 206 and the processing device(s) 230 also constituting computer-readable media. The user device 200 may also include one or more input devices 218 (keyboard, mouse device, specialized selection keys, touch sensor, touch screen, etc.) and one or more output devices 220 (displays, printers, audio output mechanisms, touch screens, etc.).

The user device 200 may further include a wireless modem 222 or network interface controller (NIC) to allow the user device 200 to communicate via a wireless network (e.g., such as provided by the wireless communication system) with other computing devices such as remote computers, the service provider system, online book stores, electronic catalogs for libraries, and so forth. The wireless modem 222 may allow the user device 200 to handle both voice and non-voice communications (such as communications for text messages, multimedia messages, media downloads, web browsing, etc.) with the wireless communication system 110. The wireless modem 222 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), Wi-Fi, etc. Alternatively, the user device 200 may include a wired NIC (e.g., an Ethernet NIC).

Media consumption module 260 presents electronic works and additional data files, such as for data overlays. Media consumption module 260 may present both an electronic work and a data overlay associated with the electronic work together to provide a single presentation experience that integrates the electronic work and additional information from the additional data file. The additional data file includes information on user consumption behaviors associated with portions of the electronic work. Accordingly, relevant user consumption behaviors may be shown by the additional data file together with (e.g., as an overlay over) a displayed portion of the electronic work. The media consumption module 260 is discussed in greater detail with reference to FIG. 3 below.

Figure 3:
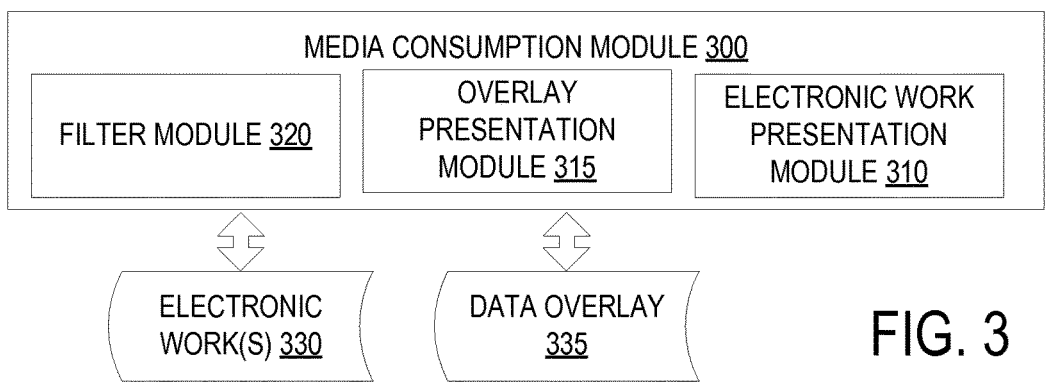
FIG. 3 is a block diagram of one embodiment of a media consumption module.

FIG. 3 is a block diagram of one embodiment of a media consumption module 300 that is included in a user device such as user device 200. In one embodiment, media consumption module 300 includes an electronic work presentation module 310, an overlay presentation module 315, and a filter module 320. In alternative embodiments, the functionality of one or more of the electronic work presentation module 310, overlay presentation module 315, and/or a filter module 320 may be combined into a single module or divided into multiple modules.

Electronic work presentation module 310 renders and presents electronic works 330 on the user device 200. Electronic work presentation module 310 may present just a single type of media (e.g., electronic books or videos), or may be operable to present multiple different types of media. For presentation of electronic books, electronic work presentation module 310 may determine a text size, font, spacing, margins, etc. and reflow contents of the electronic book. Electronic work presentation module 310 may then divide the contents into pages, and present a particular page of the electronic work at a time. For presentation of videos, electronic work presentation module 310 may determine a resolution of a display on which the video is to be presented, and render a selected video for presentation using the determined resolution.

Overlay presentation module 315 presents data from a data file, such as in a data overlay 335 together with the presented electronic work. Alternatively, overlay presentation module 315 may display the data separate from the electronic work. The data overlay 335 (or other data structure) includes a graphical interface that shows numerous aggregated consumption behaviors of a particular electronic work. For example, in the case of a data overlay 335 created for an e-book, the data overlay 335 includes numerous aggregated reading behaviors of readers with regards to the e-book. Such aggregated reading behaviors may include average reading speeds per page of the e-book, average reading speed for the entire e-book, aggregations of one or more e-book rankings (described below), average location in the e-book at which readers abandoned the e-book, aggregated reader comments for the e-book, aggregated reader highlights and annotations for the e-book, particular portions of the e-book that readers liked or disliked, particular characters of the e-book that readers liked or disliked, aggregated interactions with a second screen (e.g., a separate overlay that provides character information, definitions, links to external content, etc.) and so on.

In the case of a data overlay or other data structure for a video such as a movie or television series, the data overlay 335 (or other data structure) includes a graphical interface that shows numerous aggregated viewing behaviors with regards to the video. Such aggregated viewing behaviors may include where viewers fast forwarded through content, where viewers rewinded, differences between episodes, where viewers abandoned a series or movie (e.g., what episode and/or what location in an episode or movie), how quickly viewers progressed through the series, aggregated interactions with a second screen (e.g., a separate overlay that provides character information, definitions, links to external content, etc.), and so on. For example, the second screen experience may be leveraged to identify that a particular actor received a large spike in interest, and that information may be identified to a movie studio.

Some or all of the aggregated consumption behaviors may be associated with particular portions of the electronic work. For example, different average reading speeds may be associated with each portion (e.g., each page, passage, etc.) of the e-book. Similarly, reader comments or reviews may be associated with particular portions of the e-book that the comments or reviews most closely correspond to. Additionally, reader highlights, annotations, etc. may be associated with particular portions of the e-book. A particular portion of the e-book may also be identified as a common abandonment point of readers. For example, a last word of an electronic book presented on each of a plurality of user devices may be determined based on interaction data received from the plurality of user devices. These last words read may then be averaged to determine a common abandonment point.

In some implementations, the aggregated reading behaviors may be located or placed adjacent to the associated portion of the electronic book and the content being displayed may be reflowed around the annotation, such that the annotation may be displayed in-line with the content. In this manner, aggregated reading behaviors may be provided in a manner to allow the user to seamlessly view aggregated reading behaviors in-line with the content and adjacent to the associated portion of the electronic book while reading the electronic book on different devices or at different orientations of the same device (e.g., vertical v. horizontal). Each aggregated reading behavior may be located or anchored to a portion of the e-book to enable the user device to reflow the content around the location of the aggregated reading behavior (for example, in response to a page turn), such that the user may view the aggregated reading behavior adjacent to or in-line with the associated portion of the electronic book.

Aggregated reading behaviors may also be displayed alongside associated portions of the electronic book. For example, a first portion of a display may be used to present a portion of an e-book and a second portion of the display may be used to present aggregated reading behaviors. The aggregated reading behaviors may be presented to the left, right, top or bottom, or combination thereof, of the portion of the e-book. For example, average reading speed for a current page may be shown at a bottom of the page, and additional aggregated reading behaviors may be shown to the right of the page. In another implementation, two user devices may be synchronized, so that a first user device displays a portion of the electronic book and the a second user device displays aggregated reading behaviors associated with the portion of the electronic book displayed on the first user device. In another implementation, the data overlay or other data structure may be presented on a web application (e.g., accessible by a web browser). The web application may present the data overlay and may additionally present the electronic work together with or separate from the data overlay.

In one embodiment, the data overlay 335 is implemented as one or more layers that may be turned on or off. A layer menu may be provided that enables a user to turn on or off the entire data overlay or portions of the data overlay 335 (e.g., with respect to particular aggregated consumption behaviors). For example, the layer menu may include one or more user selectable options, such as "Flags," "Annotations," "Highlights," "Rankings," "Reading Speeds," etc. that allow the user to turn off and on various types of aggregated reading behaviors when viewing the electronic work. For example, the rankings may be stored in one layer, annotations may be stored in a second layer, emphases (e.g., the underlining, circling, highlighting, or bracketing) may be stored in a third layer, reading speeds may be stored in a fourth layer, and so on. By selecting the various options provided in the layer menu, the user may turn on and off the various layers allowing the user to either view some or all of the aggregated reading behaviors related to a displayed portion of the electronic work.

In some implementations, the initial amount of information displayed for aggregated consumption behaviors may be minimal so as to consume a minimum of the display area. A user may then select a particular aggregated reading behavior to view additional information about that aggregated reading behavior.

Filter module 320 provides multiple filter options to a user. The filter options may enable the user to filter out (e.g., remove) any subset of consumer profiles taken into consideration to compute the aggregated reading behaviors. Accordingly, the user may determine aggregated reading behaviors for particular consumer profile subsets. For example, a user may select filter options to filter out the aggregated reading behaviors based on consumer demographics (e.g., age, gender, reading preferences, reading history, a rank assigned to the electronic work by consumers (e.g., from consumer profiles), native language, and so forth). A user may additionally select filter options to filter out individuals from the aggregated reading behaviors based on data of consumption, geographic location, selling price, season, and so forth. Authors may then compare aggregated consumption behaviors of a first group against one or more additional groups. Alternatively, or additionally, media consumption module 300 may perform such comparisons for authors and provide comparison results. For example, media consumption module 300 may compare the aggregated consumption behaviors from consumer profiles of consumers living in a first region verses consumers living in a second region. In another example, media consumption module 300 may compare the aggregated consumption behaviors of readers who assigned a ranking of 5 to a book verses the aggregated consumption behaviors of users who assigned a 1 to the book. Many other comparisons may also be performed.

As discussed, overlay presentation module 315 may present a data overlay or other data structure that shows aggregated reading behaviors of consumer profiles for an electronic work together with portions of the electronic work. Overlay presentation module 315 may additionally present an overlay outline that shows where in the electronic work potentially interesting or valuable aggregated consumption behaviors are located and/or where particular types of aggregated consumption behaviors are located. For example, the overlay outline may reference portions of the electronic book that readers found particularly engaging, where people stopped reading, etc.

The user may scroll through the overlay outline and select a particular portion of the electronic work associated with a particular aggregated reading behavior for viewing. Responsive to such selection, the electronic work presentation module 310 may display the selected portion, and overlay presentation module 315 may display the aggregated reading behaviors associated with that selected portion.

The outline may provide useful information such as a timeline, heat map and/or other visual representation of the entire electronic work. For example, a visual representation of associations between portions of the electronic work and values of particular aggregated consumption behaviors associated with the portions of the electronic work may be shown. The map or other visual representation may show reading speeds associated with each portion of the electronic work, where readers stopped reading the electronic work, etc. The reading speeds, reading stop points, etc. may be shown in a color coded format for easy viewing and interpretation by a user.

Filter module 320 may filter out specific categories of aggregated consumption behaviors displayed in the overlay outline based on user selection of filter options. For example, a user may select filter options to only show where users stopped reading an e-book, reading speeds, annotations, rankings, etc. A displayed map may then be updated to exclude those aggregated consumption behaviors that are being filtered out. Additionally, as previously mentioned, filter options may be selected to change the pool of users used to compute the aggregated reading behaviors. The displayed map may be updated in view of such selected filter options.

Some types of aggregated consumption behaviors may relate to an electronic work in general, and less so to particular portions (e.g., reading locations) in the electronic work. For such types of aggregated consumption behaviors, the aggregated consumption behaviors may be shown in the outline or a meta overview of the electronic work. For example, the outline may contain information identifying general rankings of the electronic work as a whole, how consumers felt about particular characters, pricing information, critiques or information relating to an overarching story line, and so forth. Such information may be presented in detail in the outline. Additionally, high level reminders or versions of the information may be presented in portions of the electronic work that are particularly pertinent to that information. Such high level reminders may include links back to the full information on a particular aggregated reading behavior. The aggregated reading behaviors of a particular type on individual pages might provide additional information on how the aggregated reading behaviors relate to those particular pages, for example.

Figure 4:
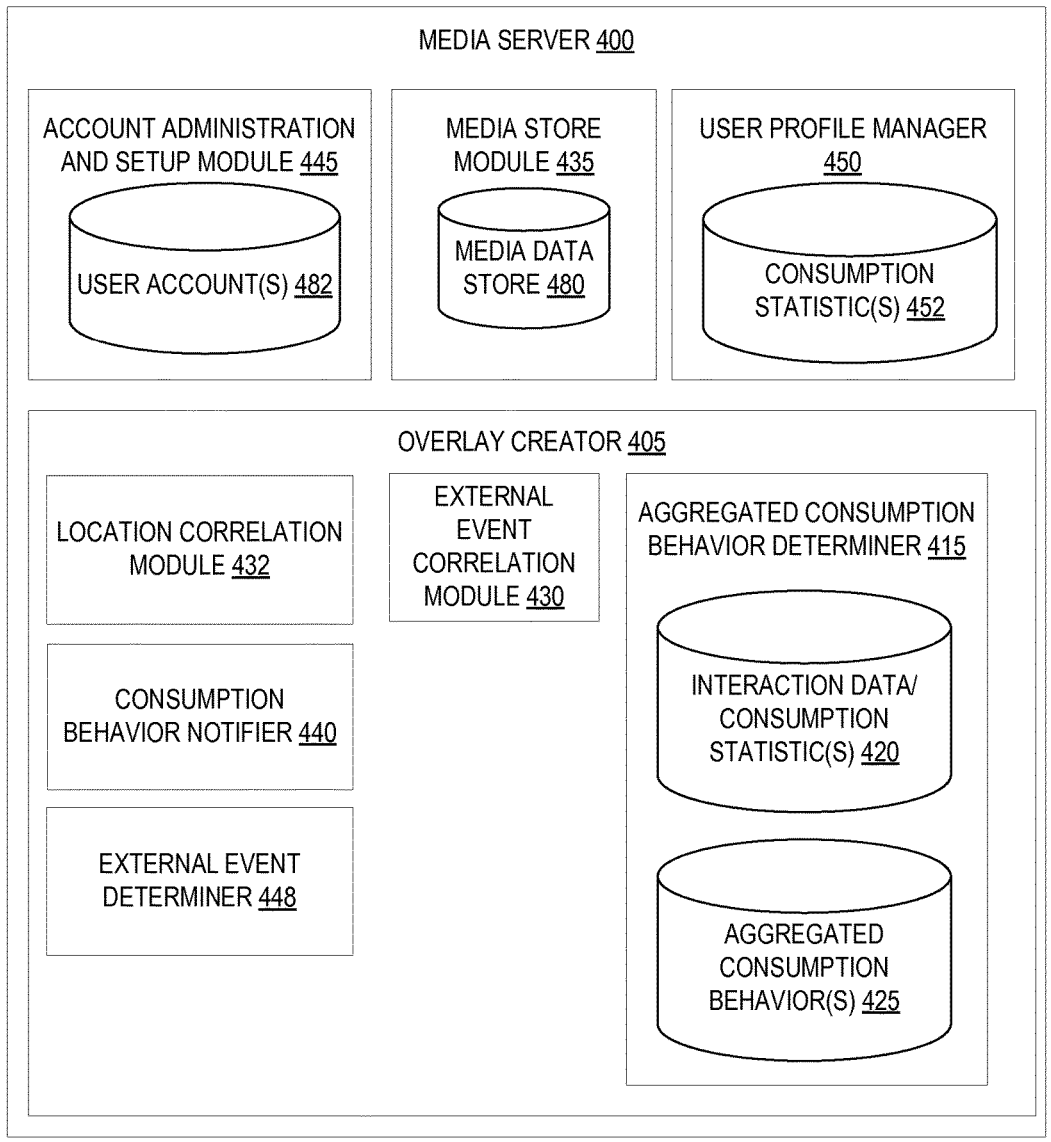
FIG. 4 is a block diagram of one embodiment of a media server.

FIG. 4 is a block diagram of one embodiment of a media server 400, which may be a media server hosted by service provider system 102 of FIG. 1. In one embodiment, the media server 400 includes an overlay creator 405, a media item store module 435 and an account administration and setup module 445. Alternatively, the functionality of one or more of the overlay creator 405, media item store module 435 and/or account administration and setup module 445 may be combined into a single module or divided into multiple modules.

Media server 400 interfaces with user devices to provide data such as electronic works to those user devices. The media server 400 includes functionality which allows the media server 400 to interact with clients running on user devices. Media server 400 may receive requests from user devices to browse contents of a media store module's data store 480. Additionally, media server 400 may receive requests to perform actions from the user devices, such as requests to purchase publications, requests to check out electronic works (e.g., from a library), requests to reserve electronic works, requests to place electronic works in a wish list, and so on. Responsive to such a request for an electronic work, media server 400 may send the electronic work to the requesting user device.

The media store module 435 enables a user to purchase electronic works from the media server 400. The media store module 435 includes or has access to a media data store 480, which has a catalog of electronic works. The electronic works in the catalog may be electronic versions of publications, movies, television shows, albums and/or other electronic works, which may be available for purchase from the media store module 435. Some electronic works in media data store 480 may be publications sold by third parties that contract with an operator of media server 400. Media store module 435 may provide the same functionality for such publications that are sold by the contracting third parties as for the publications sold by the media server 400.

The media store module 435 includes functionality allowing a user to search and browse through the electronic works catalog in the media data store 480. The media store module 435 may also include functionality allowing a user to purchase electronic works (or, more generally, acquire electronic works based on any terms).

The media store module 435 may include Item Review and Acquisition (IRA) functionality. The IRA functionality allows a user to review items in the media data store 480 by entering search terms, viewing browse categories, and so on. The IRA functionality may also present one or more recommended items to the user, e.g., based on the user's prior interests, or based on generally popular items, and so on. The IRA functionality also allows the user to place items in a shopping cart and purchase (or otherwise acquire) the items. Interactions of users with the media store module 435 (e.g., browsing of electronic works, selection of electronic works for further review, etc.) may be recorded by media store module 435 and later used to determine aggregated consumption behaviors 425.

Account administration and setup module 445 is responsible for managing user accounts 482. User accounts 482 may include or be associated with user information such as user login and password, a user profile, user geographic location, user demographic information, user purchase history, user reading history, user viewing history, and so on. For instance, a user account 482 for a user may include a user profile associated with that user. The user profile may be associated with one or more e-book identifiers, video identifiers, etc. that correspond to electronic works included in a library associated with the user. Additionally, the user profile may also include consumption statistics corresponding to each of the identifiers.

User profile manager 450 is responsible for creating and maintaining user profiles that are associated with user accounts 482 of users. User profile manager 450 may receive interaction data and/or consumption statistics 452, and/or may determine user consumption statistics 452 from received user information. User profile manager 450 has access to all information associated with a particular user that has consumed an electronic work (e.g., user demographics, purchase history, location, consumption history, etc.) as well as all information associated with the electronic work (e.g., genre, price, release date, etc.). The received user information may include received interaction data and/or consumption statistics representative of user interactions with one or more electronic works. Such data may include raw data such as time spent on each page of a book (e.g., how long particular portions were displayed), length of reading or viewing sessions, comments, highlights, annotations, last time book was opened, and so on. For example, as discussed above with reference to FIG. 1, a user device may be configured to transmit, to the media server 400, interaction data representative of interactions of the user with the user device, which may include consumption statistics 452 computed by the user device. Alternatively, consumption statistics 452 may be computed from received interaction data. User profile manager 450 may associate each set of consumption statistics 452 (e.g., each set corresponding to a respective session) with an appropriate user profile and electronic work identifier.

According to one example use case, the user profile manager 450 may use the consumption statistics 452 to determine respective scores associated with one or more electronic work identifiers. Under this use case, it may be assumed the electronic work identifiers correspond to electronic works in a user's library that have been read or viewed by the user. To this end, a score for a particular electronic work (e.g., an e-book represented by a particular e-book identifier) may indicate a user's level of interest in the electronic work. A greater score for the electronic work may indicate a greater level of user interest in the electronic work.

In order to determine, for example, a reading score for an e-book, user profile manager 450 may identify, from the consumption statistics 452, an amount of text associated with the e-book, an amount of time the user has spent reading the e-book, and a number of read sessions that the user has taken to read the e-book. By comparing the amount of text to the amount of time, the user profile manager 450 may determine a reading speed associated with the user's reading of the e-book. In some implementations, the amount of text may correspond to an amount of locations in the e-book. A location in an e-book may correspond to one or more underlying byte ranges of the e-book. It will be appreciated, however, that any other types of metrics for measuring the text may also be used, such as an amount of words, paragraphs, pages, and/or the like. Similarly, the reading speed may be determined using any metric, such as (e.g., words per minute, pages per minute, locations per minute, etc.).

As such, the user profile manager 450 may determine, using the reading speed and the number of read sessions, a reading score for the e-book. To this end, a greater reading speed may result in a greater reading score. For example, it may be assumed that the faster the user reads an e-book, the more interesting the user finds the e-book. In contrast, a greater number of read sessions for the e-book may result in a decrease in the reading score. For example, it may be assumed that the more interesting the user finds the e-book, the less read sessions the user will take to finish reading the e-book. In certain implementations, the user profile manager 450 may also identify an average session length corresponding to the read sessions for the e-book. As such, a greater average session length may also result in a greater reading score for the e-book. For instance, it may be assumed that the longer the read sessions the user spends reading the e-book, the more interesting the user finds the e-book. Thus, in summary, the reading score may be directly proportional to the reading speed as well as the average session length. On the other hand, the reading score may be inversely proportional to the number of read sessions. In addition, the reading score may be stored in or associated with user accounts 482.

The user profile manager 450 may similarly determine respective scores for each of the electronic works identifiers corresponding to the electronic works in the user's library. As such, the user profile manager 450 may be configured to rank the electronic works in the library according to their respective scores.

User profile manager 450 may rank electronic works in a user's library according to, and as indicated by the consumption statistics 452, respective numbers of times the user has read, watched, listened to, etc. the electronic work. In certain implementations, the greater the number of times an electronic work has been consumed compared to other electronic works in the library, the higher the rank of the electronic work among other electronic works in the library. Separate rankings may be applied for different types of electronic works.

For example, user profile manager 450 may maintain a counter for an e-book indicating the number of times the e-book has been read by the user. Each time the user completes reading the e-book, the counter may be incremented. In order to determine whether a user has performed a completed read of an e-book, the user profile manager 450 may determine a total number of portions in the e-book (e.g., locations, words, page, and/or the like) and a number of completed portions by the user. Based on the total number of portions and the number of completed portions, the user profile manager 450 may determine a completion percentage of the e-book by the user. To this end, the user profile manager 450 may determine a completed read of the e-book by the user if the completion percentage is greater than or equal to a threshold percentage. For instance, the user profile manager 450 may identify a complete read if the completion percentage is greater than or equal to 90%.

User profile manager 450 may additionally rank electronic works in a user's library according to, and as indicated by the consumption statistics 452, respective amounts of time the user has spent consuming the electronic work (e.g., reading an electronic book) within a certain daily time-range (e.g., between midnight and 6 A.M. or any other daily time-range). For example, the greater the amount of time the user has spent reading an e-book within the daily time-range, the higher the e-book may be ranked among the other e-books in the user's library.

Numerous different types of scores may be applied to each of the electronic works in a user's library. It will be appreciated that the above described use cases are not exhaustive and that various other types of rankings and scorings are also possible. To this end, the user profile manager 450 may be configured to determine many more types of rankings using consumption statistics computed based on interaction data collected by various user devices.

User profile manager 450 may be configured to determine a user's reading speed of an e-book on a page-by-page basis. For example, upon receiving a selection and/or any other indication to turn a page of the e-book, user profile manager 450 may determine an amount of text included on the page and a spent reading time indicating an amount of time the user has spent reading the page. Based on the amount of text and the spent reading time, the user profile manager 450 may determine a page reading speed for the page.

User profile manager 450 may determine one or more pages-of-interest for the user based on spent reading times associated with one or more pages of an e-book. For instance, as described above, the user profile manager 450 may be configured to determine a spent reading time on a page-by-page basis. Alternatively, such information may be included in interaction data reported by a user device. Similarly, user profile manager 450 may determine one or more scenes of interest of a movie or other video.

According to one or more embodiments, the user profile manager 450 may be configured to determine, from the consumption statistics 452, a plurality of spent reading times associated with a particular page. It will be appreciated that while the following operations of the user profile manager 450 may be described with reference to a particular page, such operations may be similarly applied to other portions of an e-book, such as a paragraph, chapter, passage, location range, and/or the like. Using the plurality of spent reading times, the user profile manager 450 may determine an average spent reading time corresponding to the particular page of the e-book. The user profile manager 450 may determine whether the average spent reading time is greater than or equal to a spent reading time threshold, and if so, the user profile manager 450 may identify the particular page as a page-of-interest in the e-book.

In certain implementations, the user profile manager 450 may calculate a cumulative spent reading time for the particular page instead of the average spent reading time. In such implementations, the user profile manager 450 may determine whether the cumulative spent reading time is greater than or equal to a cumulative reading time threshold, and if so, the user profile manager 450 may also identify the particular page as a page-of-interest in an e-book.

Additionally, the user profile manager 450 may also determine, using the consumption statistics 452, a number of reads of the particular page, which may indicate the number of times the particular page of the e-book has been read. To this end, the user profile manager 450 may compare the number of reads with a number threshold to identify a page-of-interest (e.g., if the number of reads is greater than or equal to the number threshold, the particular page may be identified as a page-of-interest). It will be appreciated that any combination of the average spent reading time, the cumulative spent reading time, and/or the number of reads may be used to determine whether the particular page is a page-of-interest.

Furthermore, it will be appreciated that in other implementations, the average spent reading time and/or cumulative spent reading time may not be compared with respective thresholds. Rather, the user profile manager 450 may compare the average spent reading time and/or the cumulative spent reading time with other average spent reading times and/or other cumulative spent reading times associated with other pages in the e-book. To this end, the user profile manager 450 may identify the particular page as a page-of-interest if its average spent reading time and/or cumulative spent reading time is greater than a certain number of other average spent reading times and/or other cumulative spent reading times (e.g., the average spent reading time and/or the cumulative spent reading time places the particular page in a top 10 (or other number) among the other pages, a top percentile among other pages, and/or any other metric).

User profile manager 450 may additionally record additional interaction data of a user in a user profile of a user. Such additional interaction data may include user interactions with a second screen (e.g., such as a reference tool that provides additional information about words, characters, etc. included in portions of an electronic work). One type of second screen is a concordance that lists character names and facts, locations, themes, ideas, etc. presented in an electronic work. The additional interaction data added to a user profile may additionally include highlights to portions of an electronic book, notations made by the user, comments made by the user, and so forth.

Overlay creator 405 is responsible for creating a data file, such as for a data overlay that provides an interactive presentation of aggregated consumption behaviors for an electronic work. The data file may be created, for example, for an author user profile for an author of the work to give that author insight into how consumers interact with the work, what they feel about the work, and so forth. In one embodiment, overlay creator 405 includes an aggregated consumption behavior determiner 415, an external event correlation module 430, a location correlation module 432, and a consumption behavior notifier 440. Alternatively, overlay creator 405 may include other modules and/or the functionality of any of the described modules may be combined into a single module.

Aggregated consumption behavior determiner 415 aggregates the interaction data, consumption statistics 420 and other relevant data of multiple users. Additionally, aggregated consumption behavior determiner 415 may mine third party data stores for additional interaction data (e.g., user reviews, etc.) that may be pertinent to an electronic work. Aggregation of the interaction data and consumption statistics may include reviewing an entire body of interaction data and consumption statistics to determine outlier data, and then removal of the outlier data. Such outlier data may include, for example, the top and/or bottom 5% or 10% of data for a particular consumption behavior. The remainder of the data may then be averaged or otherwise combined to create a particular aggregated consumption behavior 425. This process may be performed for each aggregated consumption behavior. For aggregated consumption behaviors such as annotations or highlights, those annotations and/or highlights that are common to the most users may be used to create an aggregated annotation behavior and/or aggregated highlighting behavior. Different aggregated consumption behaviors may be determined for each portion of the electronic work. For example, different aggregated reading speeds may be determined for each individual portion or page of an electronic book.

Aggregated consumption behavior determiner 415 may additionally identify one or more trending electronic works based on consumption statistics compiled from a multitude of user profiles and/or user accounts 482. For example, the aggregated consumption behavior determiner 415 may determine and/or identify reading scores associated with an e-book with respect to numerous users. For example, many users may have read the e-book at different reading speeds and in different numbers of sessions. As a result, the users may be associated with different reading scores with respect to the e-book. To this end, the aggregated consumption behavior determiner 415 may aggregate the different reading scores (e.g., or aggregate the reading statistics associated with the e-book as a whole) and determine an average reading score for the e-book using the aggregated reading scores. Aggregated consumption behavior determiner 415 may similarly perform such generation of average reading scores for each individual page, passage, or portion of the e-book based on reading speeds, reading sessions, etc. of numerous users with respect to those pages, passages, portions, etc. The aggregated consumption behavior determiner 415 may also determine whether the average reading score for the e-book is greater than or equal to a reading score threshold. If the average reading score is indeed greater than or equal to the reading score threshold, the aggregated consumption behavior determiner 415 may identify the e-book as a trending e-book. Similar computations may be performed to determine viewing scores for videos (e.g., movies, television shows, etc.) and/or listening scores for music.

Location correlation module 432 correlates aggregated consumption behaviors 425 with portions of an electronic work (e.g., reading locations of an e-book). Each aggregated consumption behavior may be most pertinent to a particular location or locations. For many consumption statistics and interaction data, the data and statistics themselves are associated with particular portions of the electronic work. Accordingly, this data may be combined to determine a portion of the electronic work that is common to the multiple consumption statistics and/or interaction data used to generate a particular aggregated consumption behavior.

Each portion of an electronic work may be associated with an offset that identifies a location of that portion in the electronic work. For example, an electronic written work may associate a different offset with each word in the written work. The offset may be an offset from the beginning of the written electronic work. To associate an aggregated reading behavior with a portion of a written electronic work, location correlation module 432 may identify an offset in the electronic book for a word at a beginning of the portion or at an end of the portion. The location correlation module 432 may then add the offset to an entry for the aggregated reading behavior in a data file.

For other aggregated consumption behaviors such as customer reviews, the interaction data may not be initially associated with any particular locations of the electronic work. Accordingly, location correlation module 432 may perform additional operations to determine which portions of the electronic work to associate with a particular aggregated consumption behavior 425. In one embodiment, location correlation module 432 analyzes a body of comments on an electronic work and identifies mentions of particular chapters, pages, characters, events, and so forth occurring in the electronic work. Location correlation module 432 may then determine where in the electronic work such chapters, characters, events, etc. occurred, and may associate the comments to those portions. The comments associated with a particular portion may be combined into a single aggregated consumption behavior for that portion.

External events may occur on occasion that have an impact on consumption behaviors of an electronic work. For example, the user consumption of a movie or book may differ between an initial release of the movie or book, a week from the initial release, a month from the initial release, a year from the release, and so on. Additionally, events such as interviews, death of an author or actor, etc. may cause a change in consumption behaviors. For example, the readership of a book may go up if the author of that book goes on a book tour and has multiple interviews related to the book.

External event correlation module 430 determines changes in aggregated consumption behaviors 425 over time. External event correlation module 430 may determine dates that are associated with particular external events (e.g., based on receipt of information on external events that might be related to an electronic work), and correlate those dates to changes in aggregated consumption behaviors 425 over time. External events pertinent to an electronic work may include external events referencing the electronic work or referencing a creator of the electronic work. For example, external event correlation module 430 may determine that an author had an interview on a syndicated television show, and may generate two separate aggregated consumption behavior values for a particular consumption behavior, one being before the interview and one after the interview. This information may show how the interview might have impacted user behavior with regards to the electronic work.

In one embodiment, external event correlation module 430 determines an external event pertinent to an electronic work, then determines changes in the aggregated consumption behavior that correlate in time to the external event. This may include dividing the data associated with consumer interactions into at least a first subset having a first time frame relative to the external event and a second subset having a second time frame relative to the external event, and then comparing the first subset to the second subset to determine differences between the two. The first subset and second subset may be, for example, data from before and after the external event, respectively.

User profile manager 450 may continually or periodically receive new interaction data and/or consumption statistics, and may update user profiles accordingly. Additionally, aggregated consumption behavior determiner 415 may continually or periodically re-compute aggregated consumption behaviors for an electronic work. As additional data is integrated into the pool of data used to generate the aggregated consumption behaviors, those aggregated consumption behaviors may change. For example, the ranking of a book may increase or decrease.

Interested parties such as a book author may set up notification policies with consumption behavior notifier 440 to be notified of such changes in aggregated consumption behaviors. Consumption behavior notifier 440 may determine when any aggregated consumption behaviors 425 have changed. Consumption behavior notifier 440 may then determine whether any of the aggregated consumption behaviors that have changed are behaviors that a party has asked to be notified about. If so, consumption behavior notifier 440 determines whether the change exceeds a change threshold. If the change does exceed a change threshold, then consumption behavior notifier 440 sends a notification to a user profile of the interested party (e.g., to the author's user profile) identifying the changed aggregated consumption behavior or behaviors.

Figure 5:
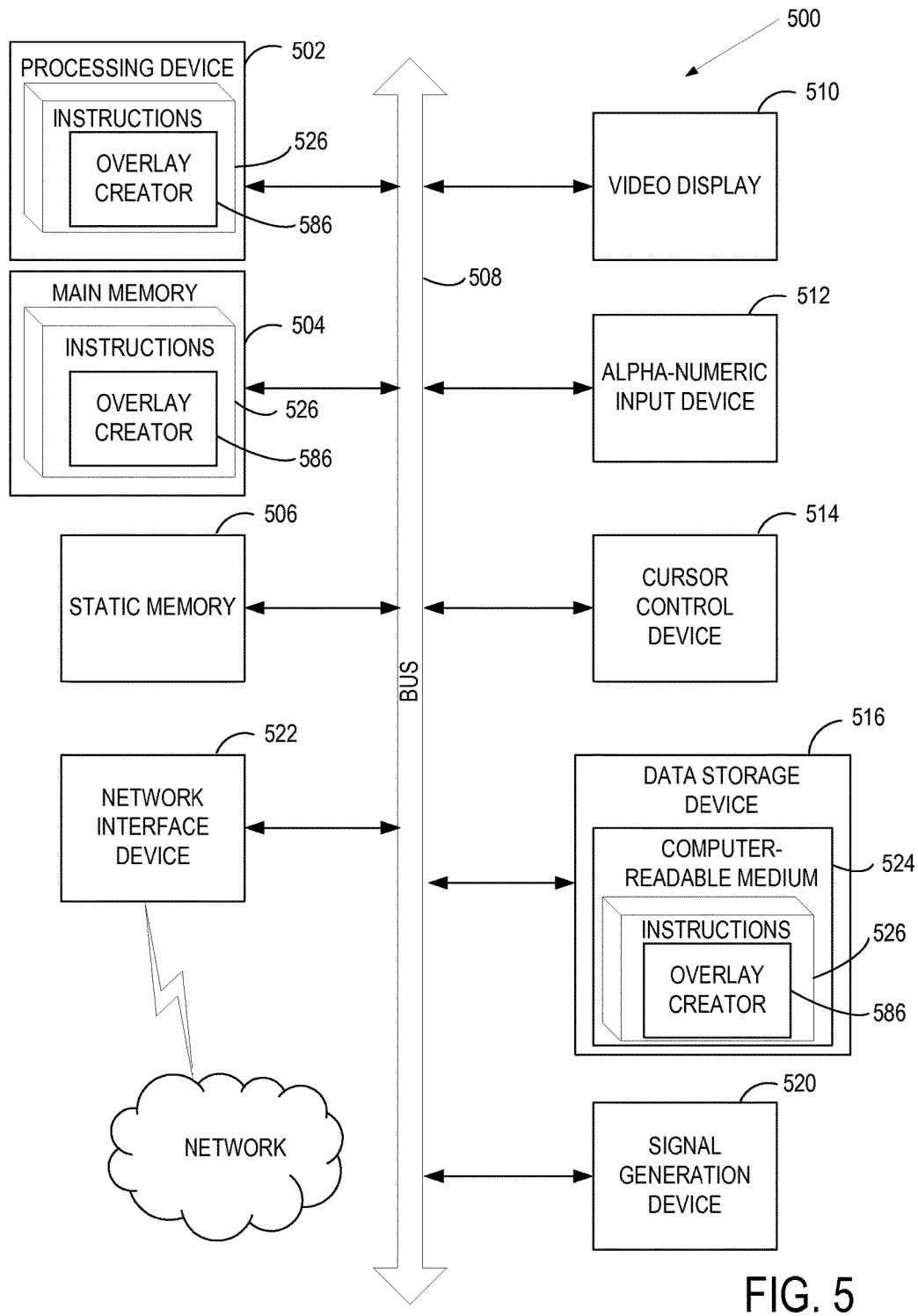
FIG. 5 is a block diagram of an example computing device that hosts an overlay creator, in accordance with one embodiment.

FIG. 5 is a block diagram illustrating an example server computing device 500. In one embodiment, the server computing device 500 corresponds to service provider system 102 of FIG. 1. The server computing device 500 includes a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary server computing device 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the overlay creator 586 for performing one or more of the operations and steps discussed herein.

The computing device 500 may further include a network interface device 522. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions (e.g., instructions of overlay creator 586) embodying any one or more of the methodologies or functions described herein. The overlay creator 586 may also reside, completely or at least partially, within the main memory 504 and/or within the processing device 502 during execution thereof by the computing device 500, the main memory 504 and the processing device 502 also constituting computer-readable media While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

FIGS. 6-11 are flow diagrams showing various methods of processing interaction data and consumption statistics of numerous users to determine aggregated consumption behaviors for electronic works. The methods further cover generating a data file such as for a data overlay for displaying the aggregated consumption behaviors in a manner that is easy to navigate for interested parties such as authors of the electronic works. The methods may be performed by a processing logic that may comprise hardware (e.g., circuitry, dedicated logic, programmable logic, microcode, etc.), software (e.g., instructions run on a processing device to perform hardware simulation), or a combination thereof. At least some of the methods are performed by a server computing device (e.g., a server computing device of service provider system 102 in FIG. 1). Some of the methods may additionally or alternatively be performed by user devices (e.g., a user device 104 of FIG. 1).

Figure 6:
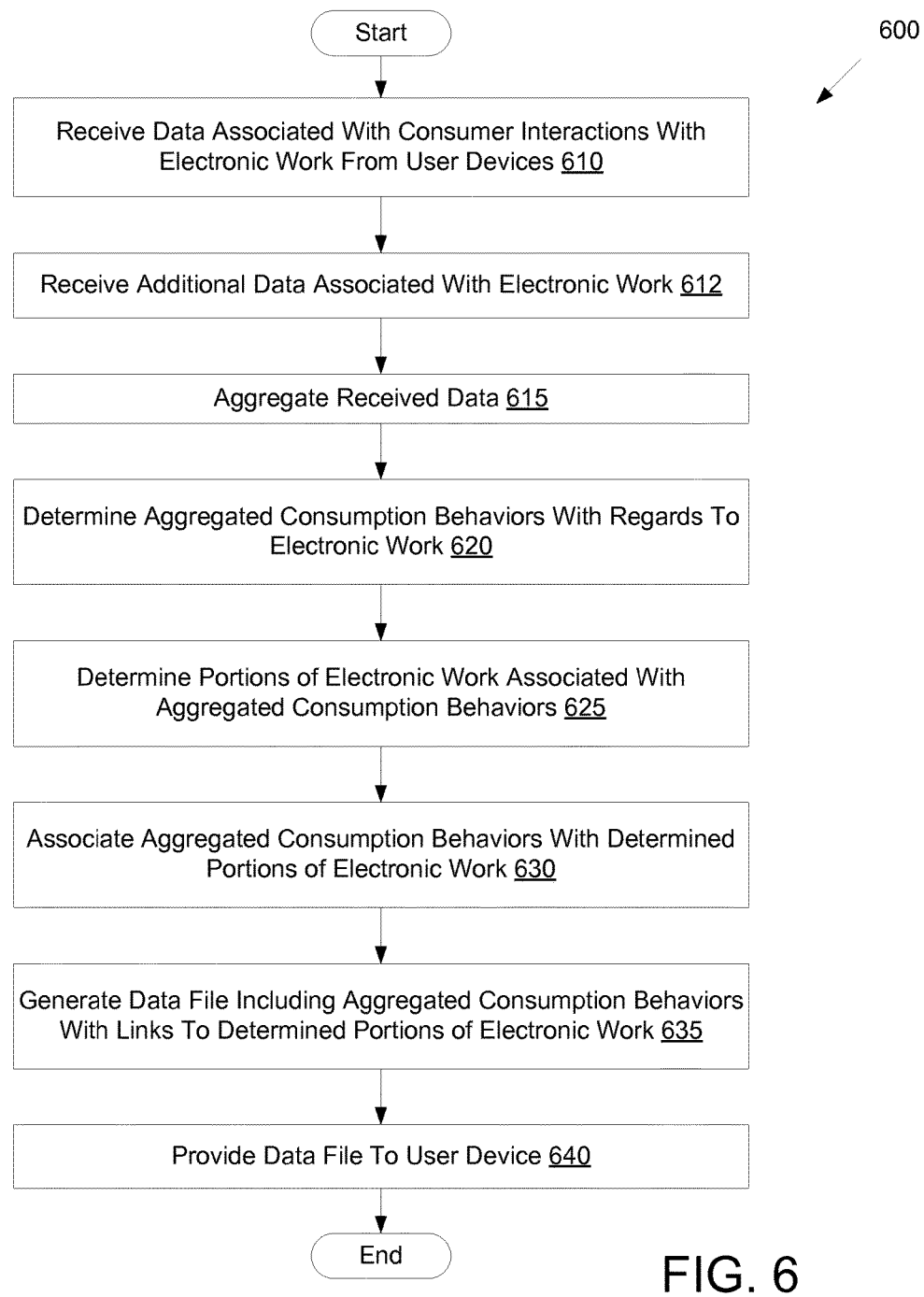
FIG. 6 is a flow diagram of one embodiment for a method of generating a data file that ties aggregated consumption behaviors with portions of an electronic work.

FIG. 6 is a flow diagram of one embodiment for a method 600 of generating a data file that ties aggregated consumption behaviors with portions of an electronic work. At block 610 of method 600, processing logic receives data associated with consumer interactions with an electronic work from user devices. The received data may include any of the previously mentioned data. Some examples of such data for an electronic book include an average duration of time that a portion of the electronic book was displayed, an average reading session length of the electronic book, indications of word locations highlighted, word locations shared or word locations quoted by the readers. In the book, for example, every word is assigned a unique location identifier, and the data would indicate a range of locations that have been highlighted, shared, quoted, or otherwise interacted with by a user based on the types of inputs you've identified.

At block 612, processing logic may also receive additional data associated with the electronic work from other sources such as third party services that collect and aggregate reviews of books or movies. Other additional data may include information on external events associated with the electronic work.

At block 615, processing logic aggregates the received data. At block 620, processing logic determines aggregated consumption behaviors with regards to the electronic work. The aggregated consumption behaviors may be aggregated reading speeds, common abandonment points for the electronic work, aggregated comments, aggregated highlights, aggregated rankings of many users, and so forth.

At block 625, processing logic determines portions of the electronic work associated with the aggregated consumption behaviors. Aggregated consumption behaviors may be divided into multiple different categories (e.g., reading speed, stopping point, comments, highlights, second screen interaction, etc.), and multiple different aggregated consumption behavior instances may be created for each category. For example, a different average reading speed may be determined for each portion of an electronic book. At block 630, processing logic associates the aggregated consumption behaviors with the determined portions of the electronic work.

At block 635, processing logic generates a data file (e.g., for a data overlay) that includes the aggregated consumption behaviors. The data file may include links to the determined portions of the electronic work associated with each of the aggregated consumption behaviors. For example, the data file may include an outline that shows a map of the electronic work and references portions of the electronic work associated with different aggregated consumption behaviors. A user may select any of the identified portions to navigate to the selected portion of the electronic work. Similarly, a data from a data file may be a shown in a separate display that is not an overlay to the electronic work. Selection of a portion of the electronic work from the data file may cause an application to load the electronic work and jump to a particular portion of the electronic work.

At block 640, the data file is provided to a user device. For example, the data file may be provided to a user device of an author (e.g., a user device associated with an author user profile) of the electronic work, a publisher of the electronic work, or other interested party that has been granted access to the aggregated consumption behaviors. The data file may enable the user device to present information associated with the aggregated consumption behavior while presenting the electronic work.

Figure 7:
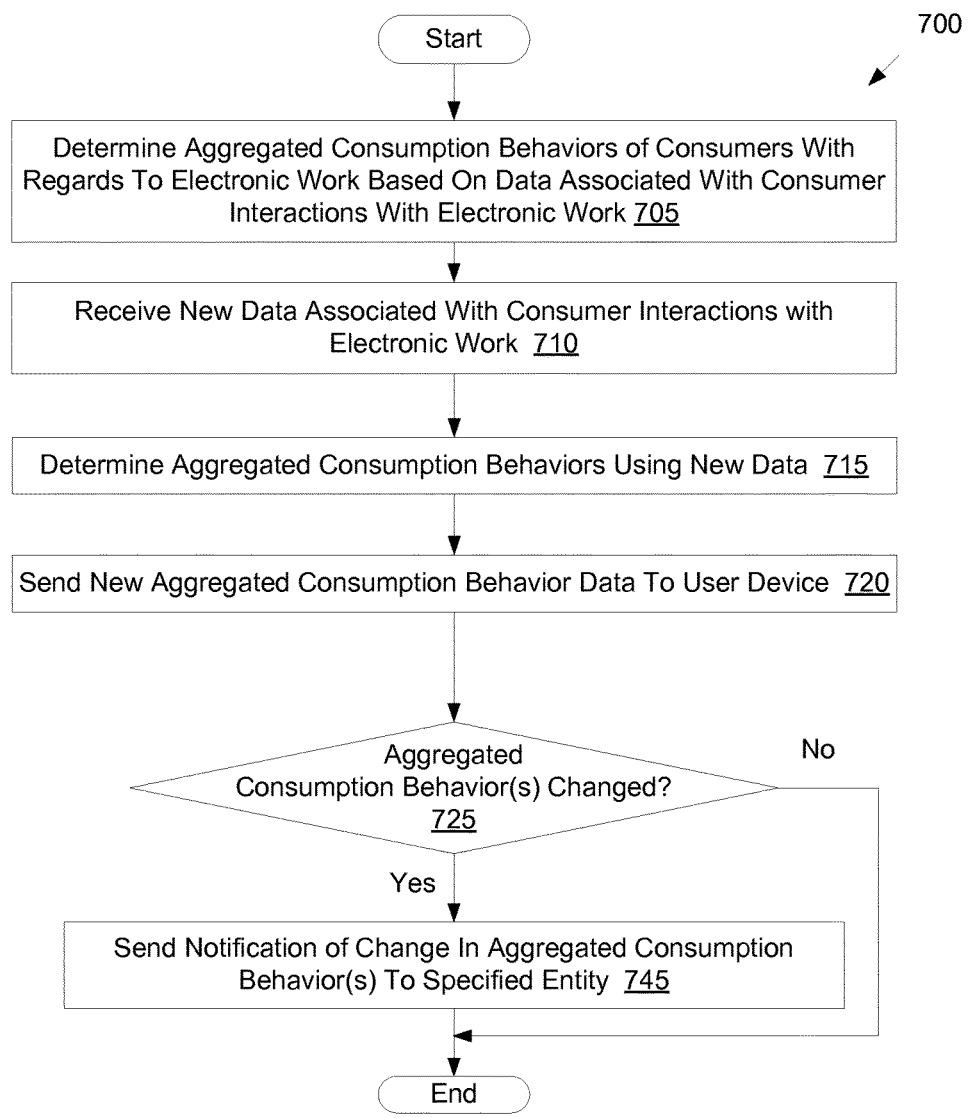
FIG. 7 is a flow diagram of one embodiment for a method of notifying an author user profile or user profile of other interested party when aggregated consumption behaviors for an electronic work change.

FIG. 7 is a flow diagram of one embodiment for a method 700 of notifying a creator or other interested party when aggregated consumption behaviors for an electronic work change. At block 705 of method 700, processing logic determines aggregated consumption behaviors of consumer profiles with regards to an electronic work based on data associated with consumer interactions with the electronic work. At block 710, processing logic receives new data associated with consumer interactions with the electronic work.

At block 715, processing logic computes new aggregated consumption behaviors using the new data and the previously received data. At block 720, processing logic then sends the new aggregated consumption behaviors to a user device (e.g., to a user device associated with a user profile of a creator). Thus, the user device may periodically or continuously receive updated aggregated consumption behavior data that reflects new interaction data, sales data, reviews, etc. At block 725, processing logic determines whether the aggregated consumption behaviors have changed more than a threshold amount. If so, the method continues to block 745 and processing logic sends a notification of the change in the aggregated consumption behaviors to a specified entity. Otherwise the method ends.

Figure 8:
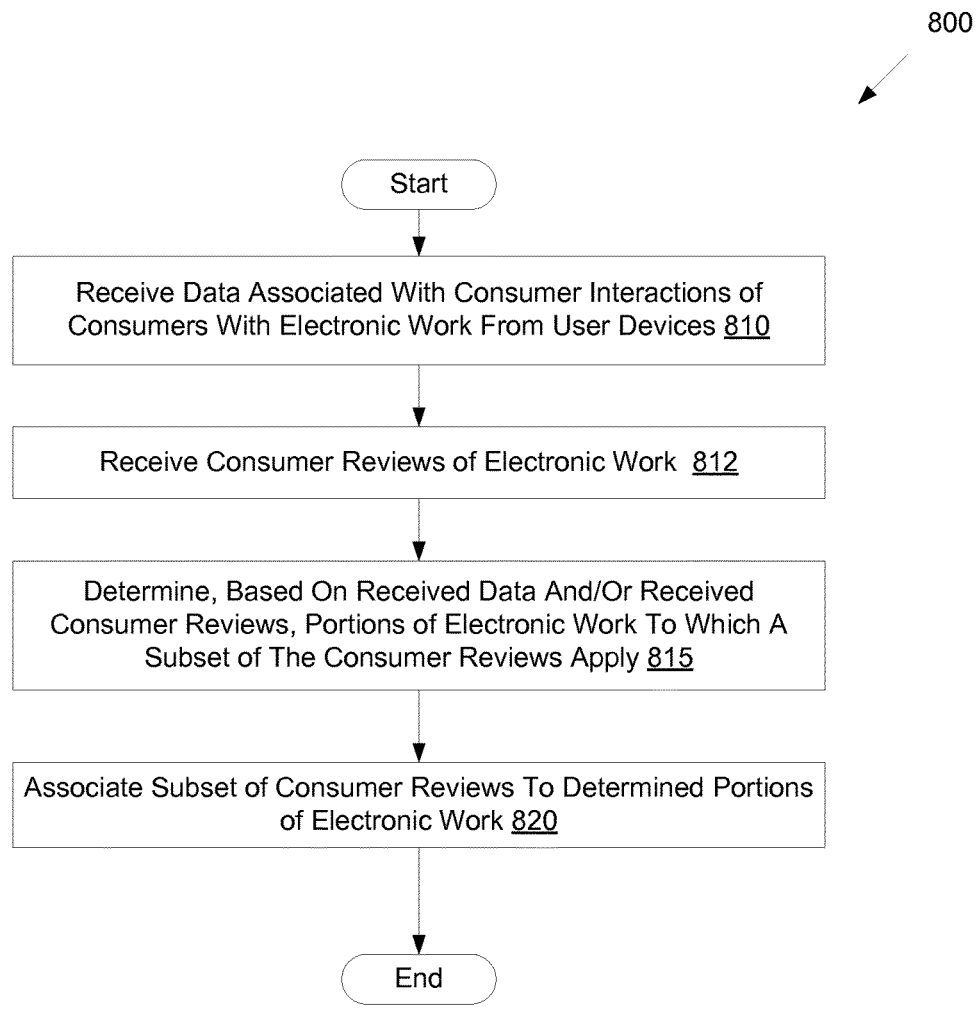
FIG. 8 is a flow diagram of one embodiment for a method of associating consumer reviews of an electronic work with particular portions of that electronic work.

FIG. 8 is a flow diagram of one embodiment for a method 800 of associating consumer reviews of an electronic work with particular portions of that electronic work. At block 810 of method 800, processing logic receives data associated with consumer interactions of consumers with an electronic work from user devices. Such data may include consumer reviews of the electronic work. At block 812, processing logic receives additional consumer reviews of the electronic work (e.g., from an additional data store that stores reviews). At block 815, processing logic determines, based on the received data and/or the additional received reviews, portions of the electronic work to which a subset of the consumer reviews apply. For example, processing logic may determine key words included in reviews and correlate those key words to portions of the electronic work. Processing logic may additionally or alternatively identify themes, events, characters, etc. and correlate to portions of the electronic work associated with such themes, events, characters, and so on. Thus, identification of the themes, events, characters, etc. (or combinations thereof) in reviews may cause those reviews to be associated to specific portions of the electronic work at block 820.

Figure 9:
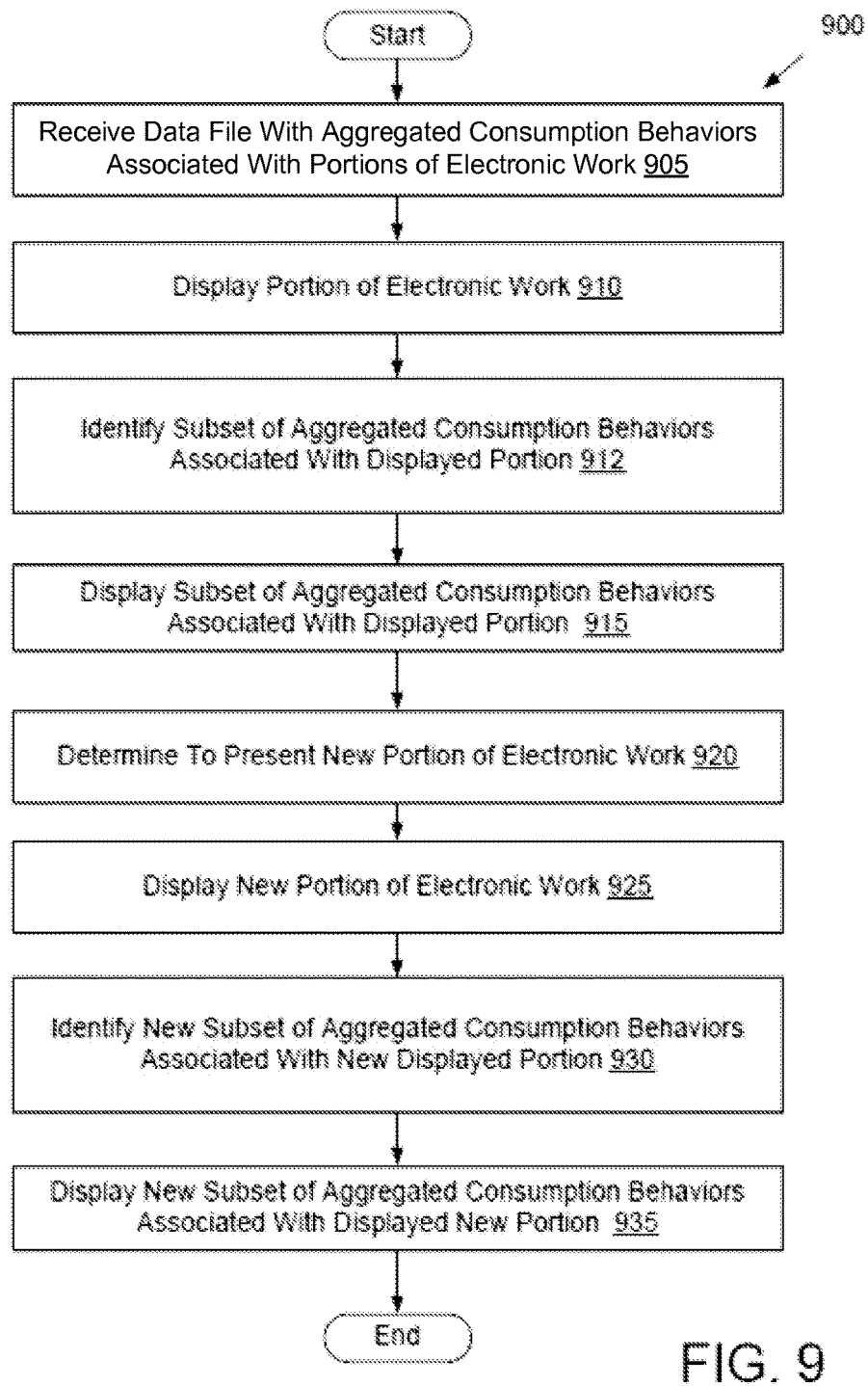
FIG. 9 is a flow diagram of one embodiment for a method of displaying aggregated consumption behaviors of portions of an electronic work alongside those portions of the electronic work.

FIG. 9 is a flow diagram of one embodiment for a method 900 of displaying aggregated consumption behaviors of portions of an electronic work alongside those portions of the electronic work. At block 905 of method 900, processing logic receives a data file (e.g., for a data overlay) with aggregated consumption behaviors associated with portions of an electronic work. Alternatively, processing logic may receive a data file containing data to be inserted into a data overlay for presentation of the aggregated consumption behaviors.

At block 910, processing logic displays a portion of the electronic work. For example, processing logic may be a component of a user device, and the electronic work may be presented in a display of the user device. In the example of an e-book, a user may read through the e-book by issuing page change commands. A current displayed portion of an e-book may be a particular page of the e-book.

At block 912, processing logic determines a subset of the aggregated consumption behaviors that are associated with the displayed portion of the electronic work. For example, processing logic may identify those aggregated consumption behaviors that are associated with passages in a currently displayed page of an e-book. At block 915, processing logic displays the subset of aggregated consumption behaviors associated with the displayed portion of the electronic work. Responsive to the user issuing a change page command (or a new scene and/or frame of a viewed movie being shown), different aggregated consumption behaviors associated with the new page (or scene or frame) may be shown.

At block 920, processing logic makes a determination to present a new portion of the electronic work. For example, processing logic may receive a change page command. Alternatively, processing logic may be playing a video, and may automatically display a new frame or scene of the video after a previous frame or scene has been presented. Alternatively, processing logic may be executing a game, and may load a new scene for the game. At block 925, processing logic displays the new portion of the electronic work.

At block 930, processing logic identifies a new subset of aggregated consumption behaviors associated with the new displayed portion. For example, processing logic may determine a reading speed associated with a new page, highlights, shares, reviews, etc. associated with passages in the new page, and so on. At block 935, processing logic displays the new subset of aggregated consumption behaviors associated with the new displayed portion. In one embodiment, the new subset of aggregated consumption behaviors is identified before the new portion is displayed. Processing logic may then display the new portion and the new subset of aggregated consumption behaviors together at the same time.

Method 900 may repeat the operations of blocks 920-935 repeatedly while a user such as an author reads, views, or otherwise consumes an electronic work. Thus, the author may be presented with aggregated consumption behavior information together with portions of the electronic work in the same experience (e.g., in the same reading experience).

Figure 10:
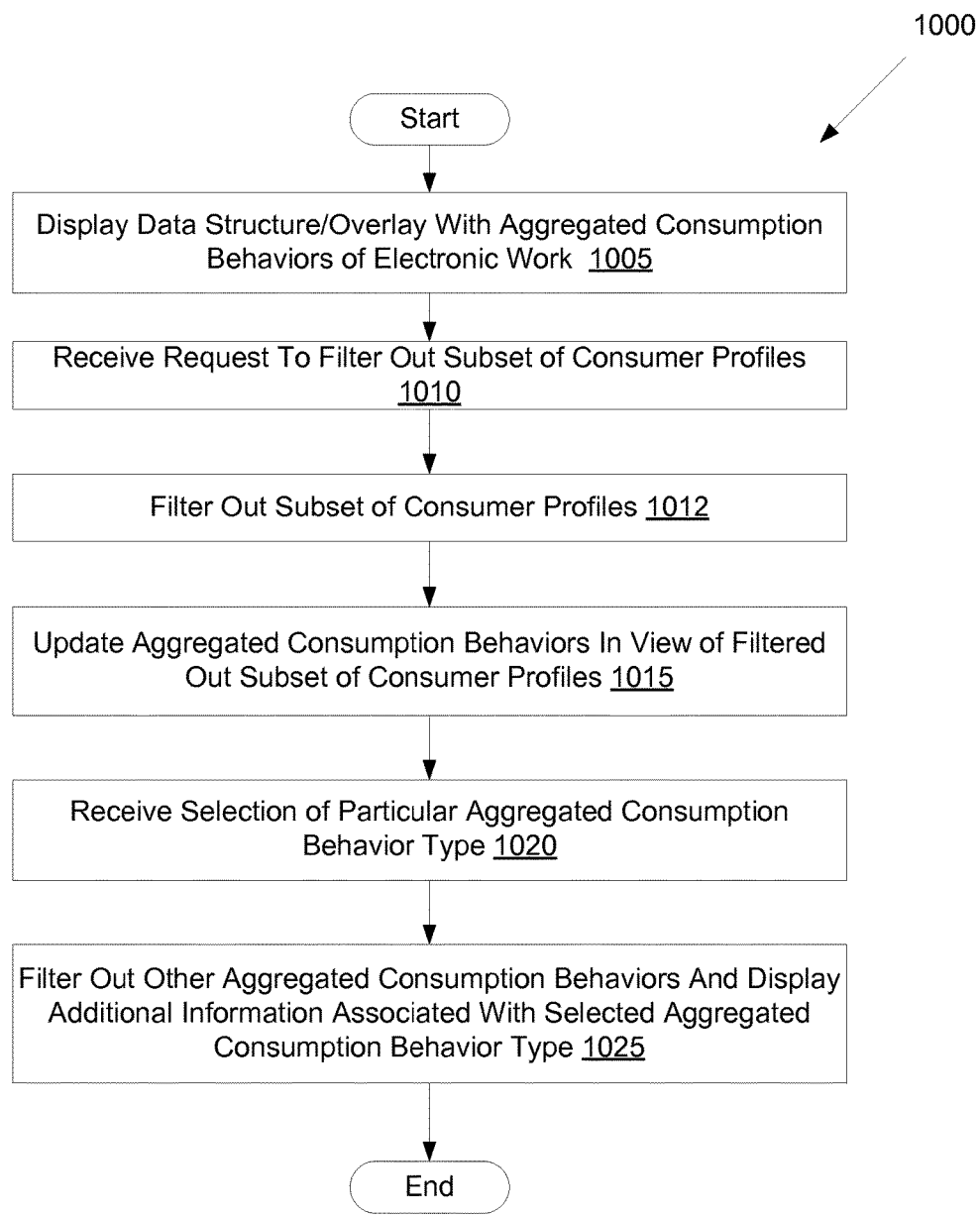
FIG. 10 is a flow diagram of one embodiment for a method of filtering aggregated consumption behaviors of an electronic work.

FIG. 10 is a flow diagram of one embodiment for a method 1000 of filtering aggregated consumption behaviors of an electronic work. At block 1005 of method 1000, processing logic displays data from a data file (e.g., in a data overlay) with aggregated consumption behaviors of an electronic work. At block 1010, processing logic receives a request to filter out a subset of consumer profiles that were used to determine the aggregated consumption behaviors. At block 1012, processing logic filters out the selected subset of consumer profiles.

At block 1015, processing logic updates the aggregated consumption behaviors in view of the filtered out subset of consumer profiles. The updated aggregated consumption behaviors may then be shown. Additionally, a user may select to filter in accordance with first filter criteria to generate a first set of aggregated consumption behaviors and may select to filter in accordance with second filter criteria to generate a second set of aggregated consumption behaviors. Processing logic may then compare the first and second sets of aggregated consumption behaviors to identify differences between the aggregated consumption behaviors for the different subsets of consumer profiles. For example, a comparison may be made between fans of fiction and non-fiction literature, between different socioeconomic groups, between users who read a book in different time ranges, and so on.

At block 1020, processing logic may additionally receive selection of a particular type of aggregated consumption behavior to view. Alternatively, processing logic may receive selection of one or more types of aggregated consumption behaviors to filter out. Responsive to such selection, at block 1025, processing logic filters out a subset of the aggregated consumption behaviors (e.g., those corresponding to types that are to be filtered out) and displays additional information associated with the aggregated consumption behavior type that was selected for viewing.

Figure 11:
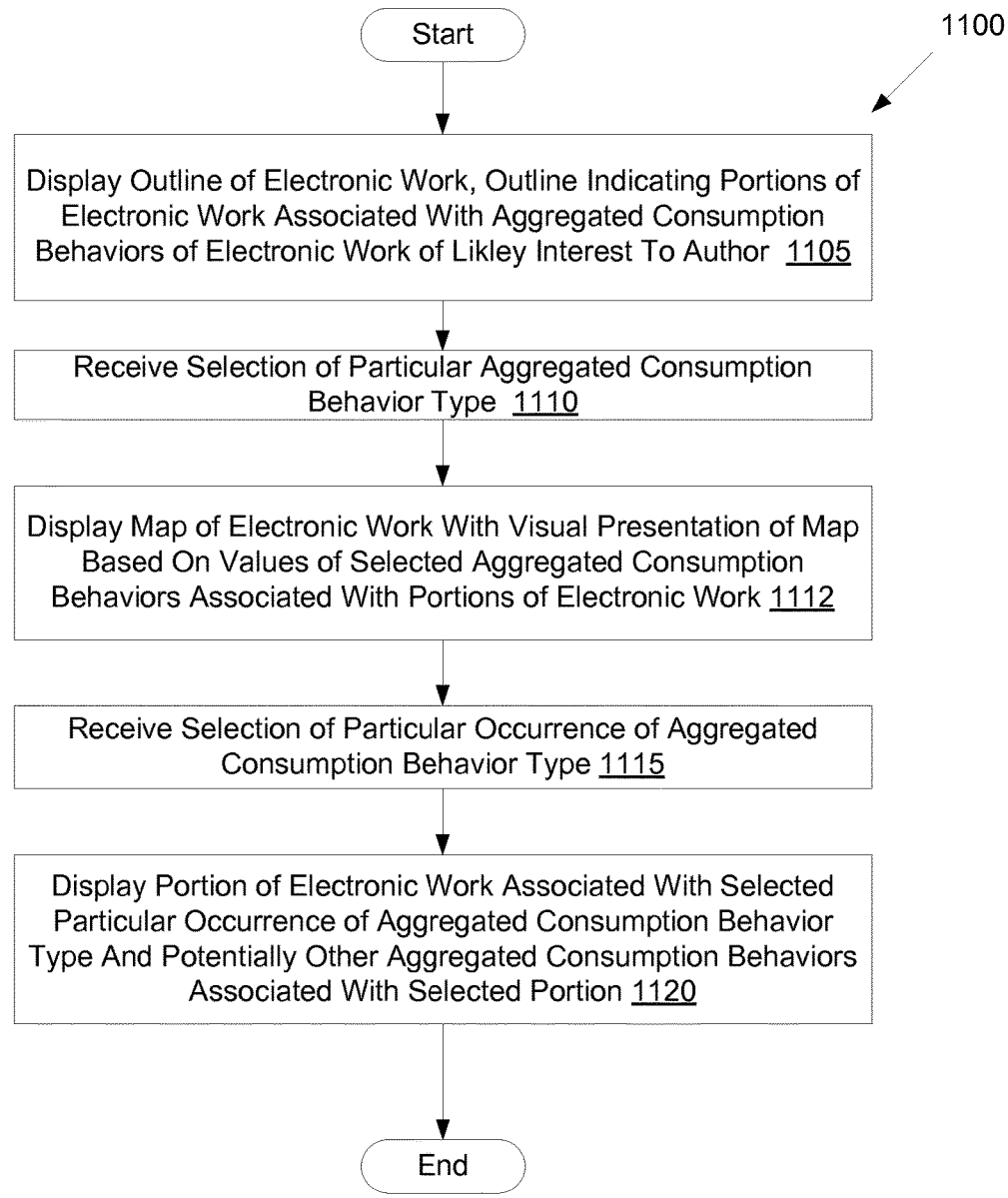
FIG. 11 is a flow diagram of another embodiment for a method of displaying aggregated consumption behaviors of portions of an electronic work alongside those portions of the electronic work.

FIG. 11 is a flow diagram of another embodiment for a method 1100 of displaying aggregated consumption behaviors of portions of an electronic work alongside those portions of the electronic work. At block 1105 of method 1100, processing logic displays an outline of an electronic work. The displayed outline may indicate portions of the electronic work that are associated with aggregated consumption behaviors of the electronic work that are likely of interest to an author or other party. The displayed outline may additionally display aggregated consumption behaviors that do not directly correlate to any particular portions, but that instead apply to the electronic work as a whole.

At block 1110, processing logic receives a selection of a particular aggregated consumption behavior type. For example, processing logic may receive a selection of notifications, of reading speeds, of abandonment points, of comments, and so on. At block 1112, processing logic displays a map of the electronic work with a visual presentation of the map being based on values of selected aggregated consumption behaviors that are associated with portions of the electronic work. For example, if reading speed was selected, then the map may graphically show reading speeds averaged over many users for different portions of a book. If highlights was selected, then the map may show concentrations of highlights throughout portions of the electronic work. If comments was selected, then the map may graphically show both the concentration of comments and the nature of the comments (e.g., positive, neutral, negative, etc.). Many other display options are also possible.

At block 1115, processing logic receives selection of a particular occurrence of a type of aggregated consumption behavior. For example, processing logic may receive selection of a particular aggregated consumption behavior that corresponds to a particular portion of the electronic work. At block 1120, processing logic displays the portion of the electronic work associated with the selected particular occurrence of the aggregated consumption behavior type. Additionally, processing logic may display other aggregated consumption behaviors associated with the displayed portion of the electronic work. Thus, a user may navigate through the electronic work based on aggregated consumption behaviors associated with different portions of the electronic work.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "determining", "associating", "providing", "identifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device, data associated with reader interactions with an electronic book, the data comprising:
      an average duration of time that a portion of the electronic book was displayed to a plurality of readers of the electronic book,
      an average reading session length of the electronic book, and at least one of indications of word locations presented, indications of word locations highlighted, indications of word locations shared or indications of word locations quoted by readers associated with the electronic book;
   determining, based on the data, an aggregated reading behavior with regards to the electronic book, the aggregated reading behavior comprising at least one of a character popularity metric, a book abandonment metric, a reading speed metric or an overlay interaction metric;
   associating the aggregated reading behavior with the portion of the electronic book in a data file, wherein associating the aggregated reading behavior with the portion of the electronic book comprises:
      identifying an offset in the electronic book for a word at a beginning of the portion or at an end of the portion; and
      adding the offset to an entry for the aggregated reading behavior in the data file;

providing the data file to a user device associated with an author user profile, wherein information about the aggregated reading behavior is to be presented in association with the word being presented on the user device;
determining an external event pertinent to the electronic book, the external event comprising an event that references the electronic book or that references an author of the electronic book, wherein the external event does not occur on any user device of a reader;
determining a date of the external event;
dividing the data associated with reader interactions into a first subset having a first time frame before the date and a second subset having a second time frame after the date;
determining a first aggregated reading behavior before the date from the first subset;
determining a second aggregated reading behavior after the date from the second subset;
determining a difference between the first aggregated reading behavior and the second aggregated reading behavior;
determining that the difference exceeds a threshold; and
providing an additional data file to the user device that indicates the difference between the first aggregated reading behavior and the second aggregated reading behavior.

2. The method of claim 1, wherein the aggregated reading behavior further comprises a book abandonment metric, wherein determining the book abandonment metric based on the data associated with the reader interactions comprises:
determining a last word of the electronic book presented on each of a plurality of user devices based on the indications of the word locations presented; and
averaging offsets of last words presented on the plurality of user devices.

3. The method of claim 1, further comprising:
generating an outline of the aggregated reading behavior of the electronic book, the outline referencing the portion of the electronic book associated with the aggregated reading behavior;
associating with the outline an identifier for the portion of the electronic book associated with the aggregated reading behavior; and
associating with the outline a pointer to the portion of the electronic book, wherein the pointer is usable to navigate to the portion of the electronic book.

4. A method comprising:
receiving, by a processing device, data associated with consumer interactions with an electronic work;
determining an external event pertinent to the electronic work, the external event comprising an event that references the electronic work or that references an author of the electronic work, wherein the external event does not occur on any user device of a consumer;
determining a date of the external event;
dividing the data associated with consumer interactions into a first subset having a first time frame before the date and a second subset having a second time frame after the date;
determining, based on the first subset, a first aggregated consumption behavior with regards to the electronic work before the date;
determining, based on the second subset, a second aggregated consumption behavior with regards to the electronic work after the date;
determining a difference between the first aggregated consumption behavior and the second aggregated consumption behavior;
determining that the difference exceeds a change threshold;
associating at least one of the first aggregated consumption behavior or the second aggregated consumption behavior with a portion of the electronic work in a data file; and
providing the data file to a user device associated with a user profile of a creator of the electronic work to enable the user device to present information associated with at least one of the first aggregated consumption behavior or the second aggregated consumption behavior while presenting the electronic work.

5. The method of claim 4, wherein the electronic work comprises a written work, wherein the aggregated consumption behavior comprises a reading speed metric, wherein determining the reading speed metric comprises determining average reading speeds reported by a plurality of user devices for a plurality of portions of the electronic work, and wherein the average readings speeds are displayable in an outline view that shows the average reading speeds for the plurality of portions throughout the electronic work.

6. The method of claim 4, further comprising:
generating an outline including the aggregated consumption behavior of the electronic work, the outline identifying the portion of the electronic work associated with the aggregated consumption behavior;
associating with the outline an identifier for the portion of the electronic work; and
inserting a pointer in the outline to the portion of the electronic work associated with the aggregated consumption behavior, wherein the pointer is usable to navigate to the portion of the electronic work.

7. The method of claim 4, wherein:
the electronic work comprises a written work, wherein the data associated with the consumer interactions comprises at least one of durations of time that passages of the electronic work were displayed, reading session lengths, indications of word locations presented, indications of word locations highlighted, indications of word locations shared or indications of word locations quoted by readers; and
the aggregated consumption behavior comprises at least one of a character popularity metric or an overlay interaction metric.

8. The method of claim 4, wherein:
the electronic work comprises a video, wherein the data associated with the consumer interactions comprises pause events, fast forward events, rewind events and viewing session lengths; and
the aggregated consumption behavior comprises one of a series abandonment metric, a character popularity metric, a series consumption speed metric or an overlay interaction metric.

9. The method of claim 4, further comprising:
receiving additional data associated with additional consumer interactions with the electronic work;
determining that the aggregated consumption behavior is changed as a result of the additional consumer interactions; and
sending a notification to the user device to notify the user profile of the creator of the aggregated consumption behavior that has changed.

10. The method of claim 4, wherein the data associated with the consumer interactions with the electronic work comprises consumer reviews of the electronic work, the method further comprising:
  determining a particular portion of the electronic work to which one or more of the consumer reviews apply; and
  associating the one or more consumer reviews with the particular portion of the electronic work.

\* \* \* \* \*